(12) United States Patent
Park et al.

(10) Patent No.: US 9,338,200 B2
(45) Date of Patent: May 10, 2016

(54) METAVERSE CLIENT TERMINAL AND METHOD FOR PROVIDING METAVERSE SPACE CAPABLE OF ENABLING INTERACTION BETWEEN USERS

(71) Applicant: ELECTRONICS AND TELECOMMUNICATIONS RESEARCH INSTITUTE, Daejeon (KR)

(72) Inventors: Sangwook Park, Chungcheongnam-do (KR); Noh-Sam Park, Daejeon (KR); Jong-Hyun Jang, Daejeon (KR); Kwang-Roh Park, Daejeon (KR); Hyun-Chul Kang, Daejeon (KR); Eun-Jin Ko, Daejeon (KR); Mi-Kyong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 14/027,592

(22) Filed: Sep. 16, 2013

(65) Prior Publication Data
US 2014/0082526 A1    Mar. 20, 2014

(30) Foreign Application Priority Data

Sep. 17, 2012    (KR) ........................ 10-2012-0102795

(51) Int. Cl.
*G06F 3/048* (2013.01)
*H04L 29/06* (2006.01)
*A63F 13/428* (2014.01)
*A63F 13/79* (2014.01)

(52) U.S. Cl.
CPC ............ *H04L 65/403* (2013.01); *A63F 13/428* (2014.09); *A63F 13/79* (2014.09); *H04L 67/38* (2013.01)

(58) Field of Classification Search
CPC ...................................................... H04L 65/403
USPC .......................................................... 715/757
See application file for complete search history.

(56) References Cited

U.S. PATENT DOCUMENTS

| 8,028,021 B2 * | 9/2011 | Reisinger ....................... 709/204 |
| 8,788,951 B2 * | 7/2014 | Zalewski et al. ............... 715/757 |
| 2008/0214253 A1 * | 9/2008 | Gillo et al. ......................... 463/1 |

(Continued)

FOREIGN PATENT DOCUMENTS

| KR | 1020050011624 A | 1/2005 |
| KR | 1020090053183 A | 5/2009 |
| WO | 2009/015880 A1 | 4/2009 |

*Primary Examiner* — William Titcomb
(74) *Attorney, Agent, or Firm* — Ladas & Parry LLP

(57) ABSTRACT

Disclosed herein are a metaverse client terminal and method for providing a metaverse space capable of enabling interaction between users. The metaverse client terminal includes a sensing data collection unit, a motion state determination unit, a server interface unit, and a metaverse space provision unit. The sensing data collection unit collects sensing data regarding a motion of a first user. The motion state determination unit determines a motion state of the first user, and generates state information data of the first user. The server interface unit transmits the state information data of the first user to a metaverse server, and receives metaverse information data and state information data of a second user. The metaverse space provision unit generates a metaverse space, generates a first avatar and a second avatar, incorporates the first and second avatars into the metaverse space, and provides the metaverse to the first user.

8 Claims, 4 Drawing Sheets

(56) References Cited

U.S. PATENT DOCUMENTS

2009/0100352 A1\* 4/2009 Huang et al. .................. 715/757
2011/0014932 A1\* 1/2011 Estevez ........................ 455/466
2013/0111366 A1\* 5/2013 Silbey et al. .................. 715/757

\* cited by examiner

| REAL SPACE | | METAVERSE SPACE | | | |
|---|---|---|---|---|---|
| MOBILE METAVERSE CLIENT TERMINAL | METAVERSE CLIENT TERMINAL | GENERAL | BASKETBALL COURT | SKATING RINK | XML |
| GYRO SENSOR IDLE | SPEED 0 ACTIVITY SENSOR IDLE | STANDING | CROSSOVER DRIBBLING | – | <STAND> |
| GYRO MOVING SPEED < RUN | SPEED < 7 | WALKING | DRIBBLING | SKATING | <WALK> |
| GYRO MOVING SPEED > RUN | SPEED > 7 | RUNNING | SPIN MOVE | SPIRAL MOVE | <RUN> |
| GYRO MOVING VECTOR > RUN | SPEED > 7 PULSE > 120 | RUNNING FAST | LAYUP SHOOTING | TRIPLE JUMPING | <FASTRUN> |
| COMPASS GYRO SENSOR DIRECTION | ACTIVITY SENSOR DIRECTION | CHANGING DIRECTION | PIVOTING | SPINNING | <TURN> |
| GYRO SENSOR HIGH ROUND | ACTIVITY SENSOR HIGH ROUND | STANDING JUMP | SHOOTING | JUMPING | <JUMP> |
| GYRO SENSOR LOW IDLE | ACTIVITY SENSOR LOW IDLE | SITTING DOWN | STOPPING | FALLING DOWN | <SIT> |
| GYRO SENSOR LOW TO UPPER | ACTIVITY SENSOR LOW TO UPPER | STANDING UP | – | – | <STANDUP> |
| GYRO SENSOR UPPER SWING | ACTIVITY SENSOR UPPER SWING | WAVING HAND | – | – | <TURN> |
| NOT DEFINED | NEED MORE SENSORS | RAISING BOTH HANDS | BLOCKING | – | <SHAKE> |
| NOT DEFINED | NEED MORE SENSORS | SALUTING | WIPING SWEAT | – | <SALUTE> |
| NOT DEFINED | NEED MORE SENSORS | RAISING LEFT ARM | – | – | <LEFT HANDUP> |
| NOT DEFINED | NEED MORE SENSORS | KICKING RIGHT LEG | – | – | <RIGHT LEGUP> |
| NOT DEFINED | NEED MORE SENSORS | KICKING LEFT LEG | – | – | <LEFT LEGUP> |

FIG. 3

METAVERSE CLIENT TERMINAL AND METHOD FOR PROVIDING METAVERSE SPACE CAPABLE OF ENABLING INTERACTION BETWEEN USERS

CROSS REFERENCE TO RELATED APPLICATION

This application claims the benefit of Korean Patent Application No. 10-2012-0102795, filed Sep. 17, 2012, which is hereby incorporated by reference in its entirety into this application.

BACKGROUND OF THE INVENTION

1. Technical Field

The present invention relates generally to a metaverse client terminal and method for providing a metaverse space capable of enabling interaction between users and, more particularly, to a metaverse client terminal and method for providing a metaverse space capable of enabling interaction between users, which can incorporate the motion state information of a user collected by a sensor or the like into the motion of the avatar of the user in a metaverse space and enable the user to interact with another user in a metaverse space using the collected motion state information of the user in real time.

2. Description of the Related Art

Recently, virtual reality, augmented reality and mixed reality technologies utilizing computer graphics technology have been developed. Virtual reality technology refers to a technology that constructs a virtual space that does not exist in the real world using a computer, and then makes the virtual space feel real. Augmented reality and mixed reality technology are technologies that provide a representation by adding information generated by a computer to the real world, that is, they are technologies that combine the real world with the virtual world and enable interaction with a user in real time.

Of these technologies, augmented reality and mixed reality technologies are mixed with technologies in various fields (for example, broadcasting technology, medical technology, game technology, etc.) and then utilized. Examples of combining augmented reality technology with broadcasting technology field include the case where, in a weather broadcast, a weather map naturally changes in front of a weather caster who is giving the weather forecast, and the case where, in a sports broadcast, an advertising image that does not exist in a stadium is inserted into a screen as if it actually exists in the stadium and then broadcast. In particular, with the advent of smart phones, augmented and mixed reality technologies have been implemented as various application services and then provided.

A representative service that provides augmented reality or mixed reality to users is a metaverse service. The term "metaverse" is a compound word of "meta" meaning "virtual or abstract" and "universe" meaning "the real world," and refers to a 3D virtual world. The metaverse is based on a concept that has evolved further than that of an existing virtual reality environment, and provides an augmented reality environment in which a virtual world, such as the Web, has been absorbed into the real world.

In connection with this, Korean Patent Application Publication No. 2009-0053183 discloses a service technology that provides context awareness (CA), that is, a groupware service, in a metaverse-based network environment in real time, so that a user can feel an immersive sensation, similar to that of being in the real world, via an avatar and a personal community, and the user can perform various activities in a cyber space, just like in the real world.

However, conventional metaverse service provision technologies for providing augmented reality or mixed reality to a user, which are disclosed in Korean Patent Application Publication No. 2009-0053183, etc., do not provide for a technology that enables users in different real spaces to interact with each other in the same virtual space, and thus is limited in that they do not support interaction between a plurality of users based on activity recognition.

SUMMARY OF THE INVENTION

The present invention is intended to provide technology that, in order to enable a user to be immersed in a metaverse space providing a high degree of freedom based on a realistic virtual world, controls the operations of actuators near a user so that the user cannot only feel the environment of the metaverse space via the five senses, but can also view it with his/her eyes, thereby providing sensory effects to the user.

The present invention is intended to provide technology that incorporates the motion state information of a user collected using a sensor or the like into the motion of the avatar of a user in a metaverse space, and that enables the user to interact with another user in a metaverse space using the collected motion state information of the user in real time.

The present invention is intended to provide technology that, when a user is moving in the real world while carrying a mobile metaverse client terminal, enables the user to interact with another user located in a separate space in the same metaverse space.

The present invention is intended to provide technology that recognizes the motions of users based on motion state information acquired using sensors or the like and enables interaction between the users suitable for the characteristics of metaverse spaces that are accessed by the respective users.

In accordance with an aspect of the present invention, there is provided a metaverse client terminal for providing a metaverse space capable of enabling interaction between users, the metaverse client terminal including a sensing data collection unit configured to collect sensing data regarding a motion of a first user acquired by a sensor; a motion state determination unit configured to determine a motion state of the first user based on the sensing data, and to generate state information data of the determined motion state of the first user; a server interface unit configured to transmit the state information data of the first user to a metaverse server, and to receive metaverse information data used to construct a metaverse space and state information data of a second user located in a space different from that of the first user from the metaverse server; and a metaverse space provision unit configured to generate a metaverse space using the received metaverse information data, to generate a first avatar moving in conjunction with the motion of the first user and a second avatar moving in conjunction with the motion of the second user based on the state information data of the first and second users, and to incorporate the first and second avatars into the metaverse space and provide the metaverse to the first user.

The metaverse client terminal may further include a device control unit configured to control an actuator that is capable of controlling a motion intensity of the first user based on the state information data of the first user.

The metaverse client terminal may further include a sensing data analysis unit configured to determine whether the sensing data collected by the sensing data collection unit corresponds to sensing data regarding a speed of the first user, sensing data regarding an action of the first user, or sensing data regarding a biological state of the first user.

The motion state determination unit, if the sensing data collected by the sensing data collection unit corresponds to the sensing data regarding a speed of the first user, may generate movement information data used to be incorporated into a speed and location of the first avatar in the metaverse space as the state information data of the first user.

The motion state determination unit, if the sensing data collected by the sensing data collection unit corresponds to the sensing data regarding an action of the first user, may generate action information data used to be incorporated into an action of the first avatar in the metaverse space as the state information data of the first user.

The motion state determination unit, if the sensing data collected by the sensing data collection unit corresponds to the sensing data regarding a biological state of the first user, may generate biological information data used to adjust a motion intensity of the first avatar by causing the device control unit to control the actuator as the state information data of the first user.

The device control unit may control an actuator that is capable of providing sensory effects to the first user in response to a motion of the first avatar in the metaverse space.

The state information data of the second user may be provided by a mobile metaverse client terminal that collects sensing data regarding the motion of the second user acquired using a gyro sensor or a Global Positioning System (GPS) module.

In accordance with another aspect of the present invention, there is provided a method of providing a metaverse space capable of enabling interaction between users, the method including, by a metaverse client terminal, collecting sensing data regarding a motion of a first user acquired by a sensor; determining a motion state of the first user based on the sensing data, and generating state information data of the determined motion state of the first user; receiving metaverse information data used to construct a metaverse space and state information data of a second user located in a space different from that of the first user from the metaverse server; generating a metaverse space using the received metaverse information data; generating a first avatar moving in conjunction with the motion of the first user and a second avatar moving in conjunction with the motion of the second user based on the state information data of the first and second users; and incorporating the first and second avatars into the metaverse space and providing the metaverse to the first user.

Collecting the sensing data regarding the motion of the first user may include determining whether the collected sensing data corresponds to sensing data regarding a speed of the first user, sensing data regarding an action of the first user, or sensing data regarding a biological state of the first user.

Generating the state information data of the determined motion state of the first user may include, if the collected sensing data corresponds to the sensing data regarding a speed of the first user, generating movement information data used to be incorporated into a speed and location of the first avatar in the metaverse space as the state information data of the first user.

Generating the state information data of the determined motion state of the first user may include, if the collected sensing data corresponds to the sensing data regarding an action of the first user, generating action information data used to be incorporated into an action of the first avatar in the metaverse space as the state information data of the first user.

Generating the state information data of the determined motion state of the first user may include, if the collected sensing data corresponds to the sensing data regarding a biological state of the first user, generating biological information data used to adjust a motion intensity of the first avatar by causing the device control unit to control the actuator as the state information data of the first user.

The method may further include controlling a second actuator that is capable of providing sensory effects to the first user in response to a motion of the first avatar in the metaverse space.

The state information data of the second user may be provided by a mobile metaverse client terminal that collects sensing data regarding the motion of the second user acquired using a gyro sensor or a GPS module.

BRIEF DESCRIPTION OF THE DRAWINGS

The above and other objects, features and advantages of the present invention will be more clearly understood from the following detailed description taken in conjunction with the accompanying drawings, in which:

FIG. 3 is an example of a mapping table based on which a metaverse client terminal or a mobile metaverse client terminal generates user state information data from sensing data with respect to each metaverse space.

DESCRIPTION OF THE PREFERRED EMBODIMENTS

Figure 1:
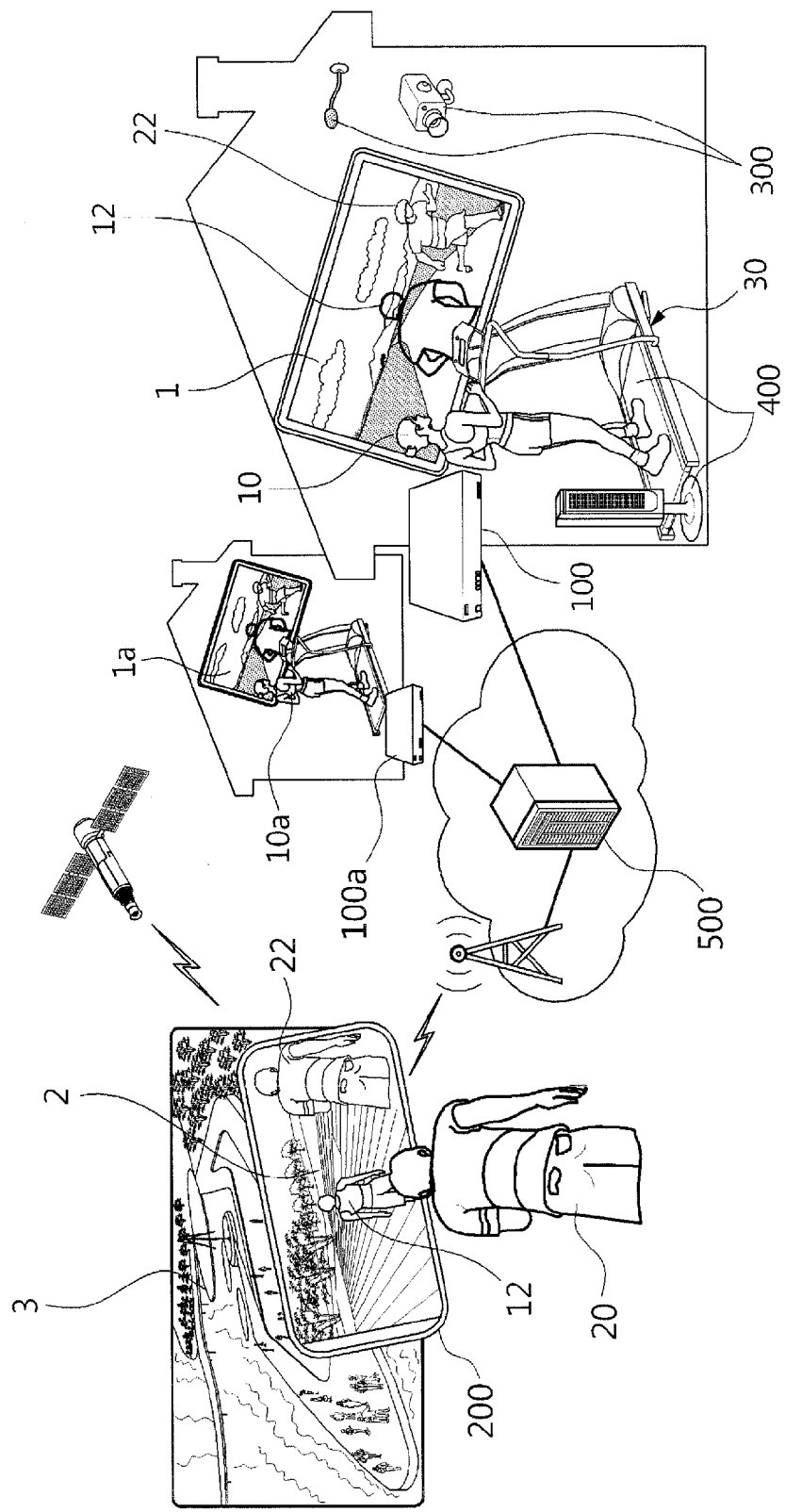
FIG. 1 is a diagram illustrating the concept of providing a metaverse space capable of enabling interaction between users using a metaverse space provision system in accordance with the present invention.

A metaverse client terminal and method for providing a metaverse space capable of enabling interaction between users according to embodiments of the present invention will be described with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the examples at the time at which the present application is filed.

The configuration and operation of a metaverse space provision system in accordance with the present invention will be described in detail below with reference to FIGS. 1 to 3.

FIG. 1 is a diagram illustrating the concept of providing a metaverse space capable of enabling interaction between users using the metaverse space provision system in accordance with the present invention.

Referring to FIG. 1, in the metaverse space provision system in accordance with the present invention, a metaverse server 500 provides various metaverse spaces 1, 1a, and 2 to a plurality of users 10, 10a, and 20 located in different real spaces. In this case, the users 10, 10a, and 20 may remotely access the metaverse server 500 using metaverse client terminals 100, 100a and a mobile metaverse client terminal 200, and then share the same metaverse space. The metaverse spaces that are provided to the users 10, 10a, and 20 by the metaverse server 500 may be spaces of various types of content, such as a hiking road, a basketball court, a skating rink, and the like. The metaverse server 500 provides metaverse spaces 1, 1a, and 2 suitable for respective characteristics to the remotely accessing metaverse client terminals 100, 100a, and 200. As an example, the metaverse server 500 provides jogging courses, such as a hiking road, based on the real world to the user 10 who is exercising on a treadmill 30 via the metaverse client terminal 100, and enables the user 10 to select one from among these courses and to access a metaverse space 1. Accordingly, the user 10 who is exercising on the treadmill 30 may be provided with the metaverse space 1 selected from among the various jogging courses provided by the metaverse server 500 via display means, such as a monitor, in the form of 3D graphic virtual reality, and may check a motion state while viewing an avatar 12 representative of the user 10 in the metaverse space 1. Meanwhile, the metaverse client terminal 100 of the user 10 who is exercising on the treadmill 30 operates the actuator 400 in accordance with the virtual world environment of the metaverse space 1 that is provided by the metaverse server 500, thereby allowing the user 10 to be provided with sensory effects. For example, when the avatar 12 of the user 10 enters a windy area in the metaverse space 1, the metaverse client terminal 100 transfers sensory effect provision information, which operates an actuator, such as an electric fan or an air conditioner, thereby causing the user 10 to actually be blown by wind and to have his or her hair blown, to the corresponding actuator via an interface. Furthermore, when the avatar 12 of the user 10 enters a sloped area or a downhill area in the metaverse space 1, the metaverse client terminal 100 may operate an actuator that adjusts the slope of the treadmill 30 in accordance with the slope of the sloped area or downhill area in the metaverse space 1, so that sensory effects can be provided to the user 10.

Meanwhile, the metaverse client terminal 100 collects information about the motion of the user 10 acquired by a sensor 300, and incorporates the motion of the user 10 into the avatar 12 in the metaverse space 1. For example, the metaverse client terminal 100 may collect the motion information of the user 10, such as information about movement or behavior, using an image sensor disposed near the user 10 or a pulse or acceleration sensor worn by the user 10, may analyze it, and may cause the avatar 12 in the metaverse space 1 to change its direction or to wave its hand. In this case, the metaverse client terminal 100 may collect information about the motion of the user 10 detected by the actuator 400, may analyze it, and may incorporate the motion into the avatar 12 of the user 10 in the metaverse space 1. For example, the metaverse client terminal 100 may collect information about the speed of the user 10 through an actuator that adjusts the speed of the treadmill 30, may analyze it, and may determine the speed or location of the avatar 12 in the metaverse space 1.

The motion state information of the user 10 on the treadmill 30, which is collected and analyzed by the metaverse client terminal 100, is provided to another metaverse client terminal 100a or the mobile metaverse client terminal 200 via the metaverse server 500, so that the plurality of users 10, 10a, 20 can interact with each other in the same metaverse space. As an example, in order to enable interaction between the user 10 on the treadmill 30 and the user 20 moving in the real world 3 in the same metaverse space, the user 20 moving in the real world 3 carries the mobile metaverse client terminal 200. The mobile metaverse client terminal 200 provides the user 20 who is walking along a hiking road in the real world 3 with the metaverse space 2 in which the user 20 is represented by the avatar 22 on a screen onto which the images of the real world 3 are projected using an augmented reality service. In this case, the metaverse server 500 receives information about the motion or location of the user 20 acquired by a gyro sensor or a Global Positioning System (GPS) module from the mobile metaverse client terminal 200, and transmits it to the other metaverse client terminals 100 and 100a. The metaverse client terminal 100 that has received the motion or location information of the user 20 who is moving in the real world 3 from the metaverse server 500 provides the metaverse space 1 into which the avatar 22 representative of the user 20 who is moving in the real world 3 has been incorporated to the user 10 who is exercising on the treadmill 30. Similarly, the metaverse client terminal 100 provides information about the motion of the user 10 who is exercising on the treadmill 30 to the metaverse server 500, and the metaverse server 500 transmits the information about the motion of the user 10, received from the metaverse client terminal 100, to the mobile metaverse client terminal 200. The mobile metaverse client terminal 200 that has received the information about the motion of the user 10 from the metaverse server 500 provides the metaverse space 2 into which the avatar 12 representative of the user 10 on the treadmill 30 has been incorporated to the user 20 who is moving in the real world 3. Accordingly, if the user 20 who is moving in the real world 3 passes by the user 10 who is exercising on the treadmill 30 in the metaverse space 1, the metaverse client terminal 100 displays the avatar 22 of the user 20 near the avatar 12 of the user 10, and thus they can meet each other while passing by each other. Meanwhile, if the user 10 who is exercising on the treadmill 30 passes by the user 20 who is moving in the real world 3 in the metaverse space 2, the mobile metaverse client terminal 200 displays the avatar 12 of the user 10 near the avatar 22 of the user 20, and thus they can meet each other while passing by each other. In summary, in the metaverse space provision system in accordance with the present invention, the metaverse client terminal 100 determines the motion state of the user 10 by analyzing the motion information of the user 10 acquired by the sensor 300 or actuator 400, the mobile metaverse client terminal 200 determines the motion state of the user 20 by analyzing the motion information of the user 20 acquired by the gyro sensor or GPS module, and the metaverse client terminals 100, 200 control the motion of the avatars 12 and 22 by exchanging the motion state information of the users 10 and 20 via the metaverse server 500, thereby enabling the users 10 and 20 to interact with each other in the metaverse space.

Figure 2:
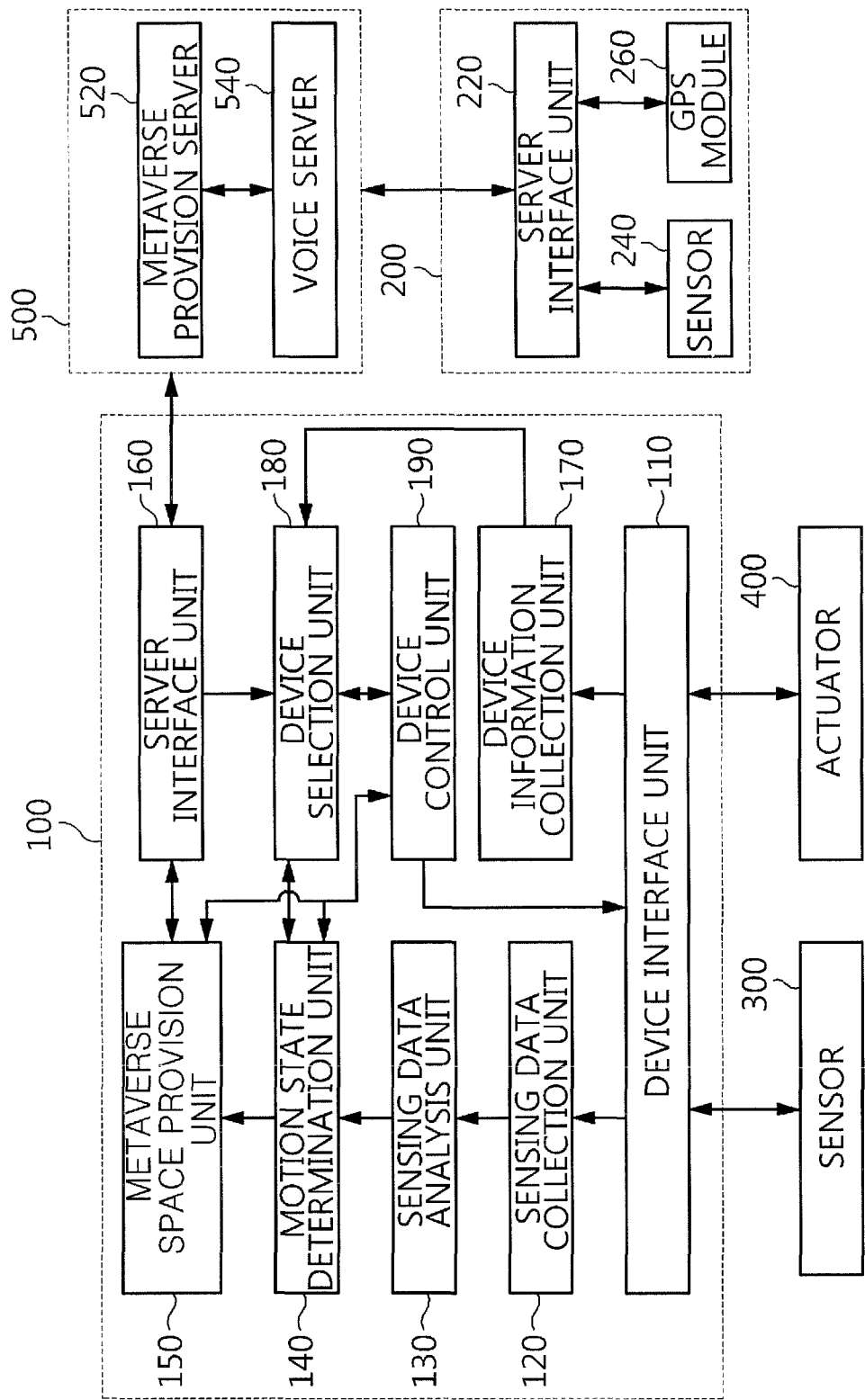
FIG. 2 is a diagram illustrating the detailed configuration and operation of a metaverse client terminal in the metaverse space provision system in accordance with the present invention.

FIG. 2 is a diagram illustrating the detailed configuration and operation of the metaverse client terminal 100 in the metaverse space provision system in accordance with the present invention.

Referring to FIG. 2, the metaverse client terminal 100 in accordance with the present invention includes a device interface unit 110, a sensing data collection unit 120, a sensing data analysis unit 130, a motion state determination unit 140, a metaverse space provision unit 150, a server interface unit 160, a device information collection unit 170, a device selection unit 180, and a device control unit 190.

The device interface unit 110 performs an interfacing function of supporting data transmission and reception between the sensor 300 for detecting the motion of the user or actuator 400 for adjusting the motion intensity of the user, and the metaverse client terminal 100. The device interface unit 110 receives sensing data regarding the motion of the user from the sensor 300 or actuator 400, and transfers the sensing data to the sensing data collection unit 120. Furthermore, the device interface unit 110 receives a control signal used to control the operation of the actuator 400 from the device control unit 190, and transfers the control signal to the actuator 400. In this case, data communication between the sensor 300 or actuator 400 and the device interface unit 110 may be performed via a Bluetooth or serial communication method.

The sensing data collection unit 120 collects sensing data from the motion of the user acquired sensor 300 or actuator 400, and transfers the sensing data to the sensing data analysis unit 130. In this case, the sensing data from the sensor 300 or actuator 400, which is collected by the sensing data collection unit 120, may correspond to sensing data regarding the speed of the user, sensing data regarding the behavior of the user, or sensing data regarding the biological state of the user.

The sensing data analysis unit 130 analyzes the type of sensing data received from the sensing data collection unit 120. That is, the sensing data analysis unit 130 determines whether the sensing data received from the sensing data collection unit 120 corresponds to sensing data regarding the speed of the user, sensing data regarding the action of the user, or sensing data regarding the biological state of the user. The sensing data analysis unit 130 provides the corresponding sensing data, together with the results of the determination, to the motion state determination unit 140.

The motion state determination unit 140 determines the motion state of the user based on the sensing data received from the sensing data analysis unit 130, and generates state information data regarding the determined motion state of the user. If it is determined by the sensing data analysis unit 130 that the sensing data collected and transferred by the sensing data collection unit 120 corresponds to sensing data regarding the speed of the user, the motion state determination unit 140 generates movement information data that is used to determine the speed, location and direction of the avatar representative of the user in the metaverse space as user state information data. Furthermore, if the sensing data collected and transferred by the sensing data collection unit 120 corresponds to sensing data regarding the action (for example, standing up, or waving his or her hand) of the user, the motion state determination unit 140 generates action information data used to determine the motion of the action of the avatar representative of the user in the metaverse space as user state information data. Meanwhile, if the sensing data collected by the sensing data collection unit 120 corresponds to sensing data regarding the biological state of the user, the motion state determination unit 140 generates biological information data used to adjust the motion intensity of the user in such a way that the device control unit 190 controls the actuator 400 as user state information data. In this case, if the generated user state information data is movement information data or action information data, the motion state determination unit 140 provides the data to the metaverse space provision unit 150, and causes the metaverse space control unit 150 to control the motion of the avatar representative of the user in the metaverse space in conjunction with the motion of the user. Furthermore, if the generated user state information data is biological information data, the motion state determination unit 140 provides the data to the device control unit 190, and causes the device control unit 190 to adjust the intensity of motion by controlling the operation of the actuator 400.

The metaverse space provision unit 150 generates a metaverse space, to be provided to the user, using the metaverse information data that is received from the metaverse server 500 via the server interface unit 160. In this case, the metaverse space provision unit 150 generates an avatar moving in conjunction with the motion of the user based on the movement information data and action information data of the user that is provided by the motion state determination unit 140. Meanwhile, the metaverse space provision unit 150 also generates an avatar moving in conjunction with the motion of another user based on the movement information data and action information data of the other user that is received from the metaverse server 500 via the server interface unit 160. Referring to FIG. 1, the movement information data and the action information data that is received by the metaverse client terminal 100 from the metaverse server 500 corresponds to the movement information data and action information data of the users 10 and 10a that are generated by another metaverse client terminal 100a, other than the metaverse client terminal 100, or the mobile metaverse client terminal 200. The metaverse space provision unit 150 provides the user 10 with a metaverse space into which the avatars of the users 10, 10a and 20 have been incorporated.

The metaverse space provision unit 150 transmits the movement information data and action information data of the user 10 to another metaverse client terminal 100a or mobile metaverse client terminal 200 via the server interface unit 160. Furthermore, the metaverse space provision unit 150 may transmit metaverse space environment information to the device control unit 190 so that the device control unit 190 can provide sensory effects to the user 10 by controlling the operation of the corresponding actuator 400 in accordance with the environment of the metaverse space in which the avatar of the user 10 is moving. Furthermore, the metaverse space provision unit 150 may transmit biological information data to the device control unit 190 of the user 10 so that the device control unit 190 can adjust the motion intensity of the user 10 by controlling the operation of the actuator 400 in accordance with the biological state of the user 10.

The server interface unit 160 transfers the movement information data and action information data of the user 10 received from the metaverse space provision unit 150 to the metaverse server 500. Furthermore, the server interface unit 160 transfers the movement information data and action information data of other users, generated by the other metaverse client terminal 100a or mobile metaverse client terminal 200, from the metaverse server 500 to the metaverse space provision unit 150. In this case, the metaverse server 500 may include a metaverse provision server 520 for providing metaverse information data for the construction of various metaverse spaces to the metaverse client terminal 100 or 100a or mobile metaverse client terminal 200, and a voice server 540 for supporting voice communication between the users 10, 10a and 20. Meanwhile, the movement information data and action information data of another user 20 who is moving in the real world, which is transmitted to the metaverse client terminal 100 through the metaverse server 500, is generated by the mobile metaverse client terminal 200. The mobile metaverse client terminal 200 may generate the movement information data and action information data of the user 20 using the acceleration sensor 240 provided therein, such as a gyro sensor, and the GPS module 260 configured to acquire the location information of the user 20, and may transmit it to the metaverse server 500 via the server interface unit 220.

The device information collection unit 170 collects and manages information about the actuators that can provide sensory effects to a user or adjust the motion intensity of a user via the device interface unit 110. Furthermore, the device information collection unit 170 may provide the device selection unit 180 with the information about the actuators.

The device selection unit 180 selects the actuator, the operation of which should be controlled so that it can provide sensory effects to a user in accordance with the environment of the metaverse space, based on the information about the actuators that is received from the device information collection unit 170. Furthermore, the device selection unit 180 may select the actuator that enables the motion intensity of a user to be adjusted based on the information about the actuators that is received from the device information collection unit 170.

If it is necessary to provide sensory effects to a user in accordance with the motion of the avatar of the user in the metaverse space, the device control unit 190 transmits an operation control signal to the actuator for providing the sensory effects, which is selected by the device selection unit 180, via the device interface unit 110 based on the metaverse space environment information that is received from the metaverse space provision unit 150. Furthermore, if it is necessary to adjust the motion intensity of a user in accordance with the biological state of the user, the device control unit 190 may transmit an operation control signal to the actuator for adjusting the intensity of motion, which is selected by the device selection unit 180, via the device interface unit 110 based on the biological information data of the user that is received from the motion state determination unit 140.

FIG. 3 is an example of a mapping table based on which the metaverse client terminal 100 or 100a or mobile metaverse client terminal 200 generates user state information data from sensing data with respect to each metaverse space.

As an example, if the speed of the treadmill 30, that is, sensing data collected for the user 10 who is exercising on the treadmill 30, is 0 or if data detected by a sensor for detecting the speed of exercise of the user 10 corresponds to an idle state, the metaverse client terminal 100 generates eXtensible Markup Language (XML) data as <stand> and then transmits the XML data to the metaverse server 500, and the metaverse server 500 transfers the XML data received from the metaverse client terminal 100 to another metaverse client terminal 100a or mobile metaverse client terminal 200. In this case, the metaverse client terminal 100, 100a or mobile metaverse client terminal 200 causes the avatar 12 of the user 10 in the metaverse space to assume "a standing posture." Meanwhile, if the motion of the user 20 detected by a gyro sensor corresponds to an idle state, the mobile metaverse client terminal 200 generates XML data as <stand>, and transmits the XML data to the metaverse server 500, and the metaverse server 500 transfers the XML data received from the mobile metaverse client terminal 200 to the metaverse client terminals 100 and 100a. In this case, the metaverse client terminals 100, 100a cause the avatar 22 of the user 20 in the metaverse space to assume "a standing posture."

As another example, if the speed of the treadmill 30, that is, sensing data collected for the user 10 who is exercising on the treadmill 30, is equal to or lower than 7, that is, a level corresponding to walking, the metaverse client terminal 100 generates XML data as <walk>, and transmits the XML data to the metaverse server 500. In a similar manner, data acquired by the gyro sensor, that is, sensing data collected for the user 20 who is moving in the real world, indicates that the user 20 is continuously moving at specific coordinate intervals, the mobile metaverse client terminal 200 computes the speed of the user 20 by analyzing per-time intervals, generates XML data as <walk>, and then transmits the XML data to the metaverse server 500.

Meanwhile, if the users 10 and 20 who are located in different spaces access different metaverse spaces, the metaverse server 500 may change the state information data of the users in accordance with the types of the corresponding metaverse spaces, and then transmit the changed state information data to the metaverse client terminal 100 or mobile metaverse client terminal 200. That is, the metaverse server 500 may transmit state information data in which the motion state of a user has been set to "walking" to the metaverse client terminal of the user who accesses a metaverse space for a general jogging course, such as a hiking road. In contrast, the metaverse server 500 may change the state information data into state information data in which the motion state of a user has been set to "dribbling," and then transmit the resulting state information data to the metaverse client terminal of a user who accesses a metaverse space for a basketball court. In this case, the metaverse client terminal that has received the user state information data corresponding to "dribbling" from metaverse server 500 may visualize the motion of the avatar of the user as the motion of moving a basketball by bouncing it several times, and then provide it to the user. Alternatively, the metaverse server 500 may change the state information data into state information data in which the motion state of a user has been set to "skating," and then transmit it to the metaverse client terminal of a user who accesses a metaverse space for a skating rink. In this case, the metaverse client terminal that has received the user state information data corresponding to "skating" from the metaverse server 500 may visualize the motion of the avatar of the user as the motion of skating on a skating rink at a specific speed, and then provide it to the user.

A method of providing a metaverse space capable of enabling interaction between users in accordance with the present invention will be described in detail below with reference to FIG. 4. It is noted that in the following description, descriptions that are the same as those of the metaverse space provision system in accordance with the present invention given in conjunction with FIGS. 1 to 3 will be omitted.

Figure 4:
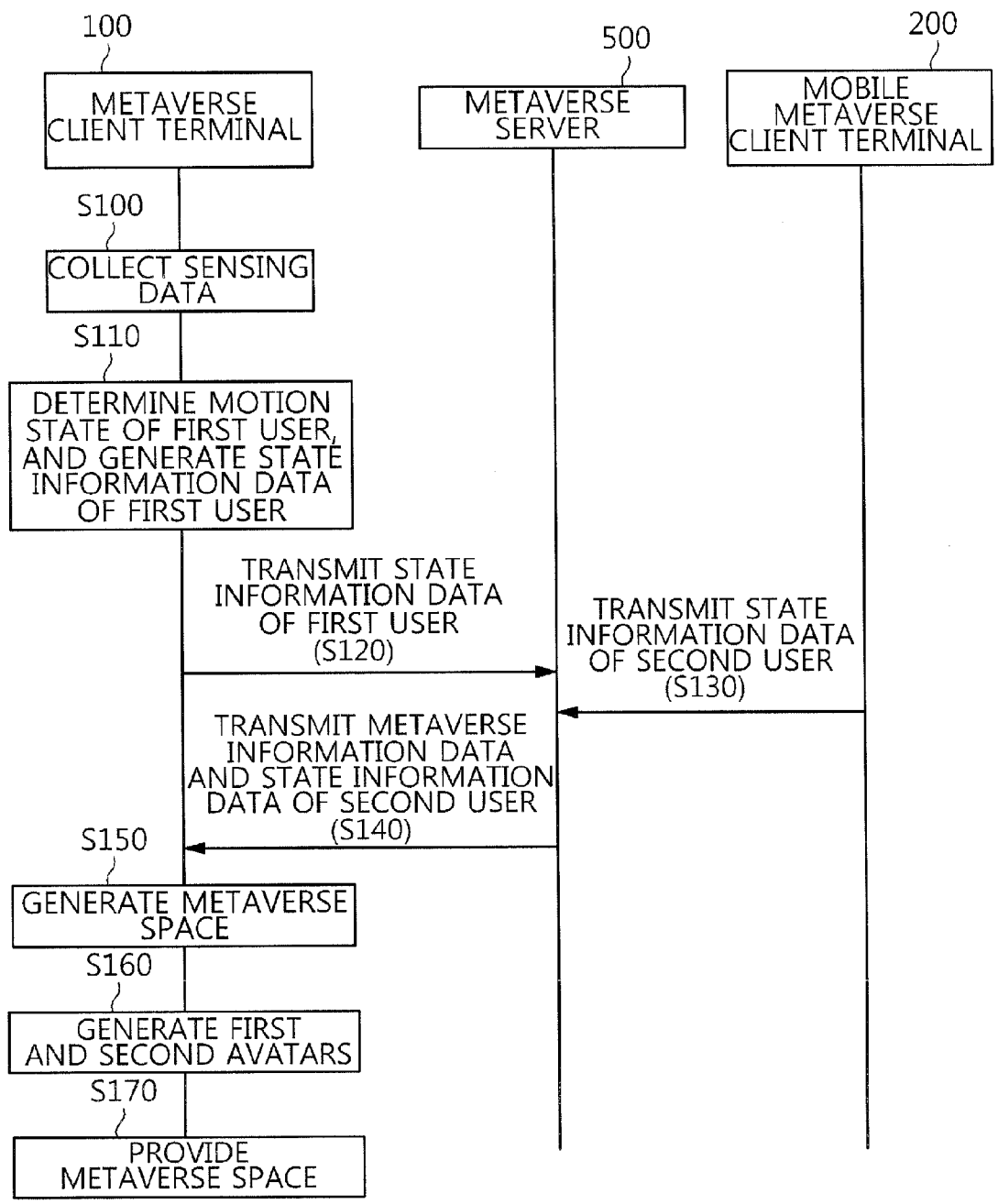
FIG. 4 is a flowchart illustrating a method of providing a metaverse space capable of enabling interaction between users in accordance with the present invention.

FIG. 4 is a flowchart illustrating the method of providing a metaverse space capable of enabling interaction between users in accordance with the present invention.

Referring to FIG. 4, in the method of providing a metaverse space in accordance with the present invention, first, the metaverse client terminal 100 collects sensing data regarding the motion of a first user that is acquired by the sensor or actuator at step S100.

Thereafter, the metaverse client terminal 100 determines the motion state of the first user based on the sensing data collected at step S100, and generates the state information data of the motion state of the first user at step S110.

At step S120, the metaverse client terminal 100 transmits the state information data of the motion state of the first user to the metaverse server 500 that is generated at step S110.

Meanwhile, the mobile metaverse client ten terminal 200 transmits the state information data of the motion state of a second user who is moving in the real world to the metaverse server 500 at step S130. It will be apparent that if the second user corresponds to a user who is exercising on a treadmill, other than the user who is moving in the real world, the metaverse client terminal 100a may transmit the state information data of the motion state of the second user to the metaverse server 500 at step S130.

The metaverse server 500 that has received the state information data of the motion state of the second user at step S130 transmits metaverse information data used to construct a metaverse space, together with the state information data of the motion state of the second user, to the metaverse client terminal 100 at step S140.

At step S150, the metaverse client terminal 100 generates a metaverse space using the metaverse information data that is received from the metaverse server 500 at step S140.

At step S160, the metaverse client terminal 100 generates a first avatar moving in conjunction with the motion of the first user based on the state information data of the motion state of the first user generated at step S110 step, and generates a second avatar moving in conjunction with the motion of the second user based on the state information data of the motion state of the second user received from the metaverse server 500 at step S140.

Finally, the metaverse client terminal 100 incorporates the first and second avatars generated at step S160 into the metaverse space generated at step S150, and then provides the metaverse to the user at step S170.

The present invention is advantageous in that a user who accesses the metaverse server via the metaverse client terminal can select one from among various metaverse spaces and then access the metaverse space, and in that the user can share a metaverse space with another remotely accessing user or interact with another user who accesses the real world using augmented reality technology, via the metaverse server.

Furthermore, the present invention is advantageous in that the present invention provides a means for interfacing between the metaverse client terminal and the sensor used to collect motion determination information, thereby enabling interaction between a user in the virtual world and a user in the real world.

Furthermore, the present invention is advantageous in that the present invention provides a method of changing motion recognition data into data suitable for the characteristic of a corresponding metaverse space at the metaverse server, thereby enabling various users to experience a sensory-effect entertainment service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A metaverse client terminal for providing a metaverse space capable of enabling interaction between users, the metaverse client terminal comprising:
    a sensing data collection unit configured to collect sensing data regarding a motion of a first user acquired by a sensor;
    a motion state determination unit configured to determine a motion state of the first user based on the sensing data, and to generate state information data of the determined motion state of the first user;
    a server interface unit configured to transmit the state information data of the first user to a metaverse server, and to receive metaverse information data used to construct a metaverse space and state information data of a second user located in a space different from that of the first user from the metaverse server; and
    a metaverse space provision unit configured to generate a metaverse space using the received metaverse information data, to generate a first avatar moving in conjunction with the motion of the first user and a second avatar moving in conjunction with the motion of the second user based on the state information data of the first and second users, and to incorporate the first and second avatars into the metaverse space and provide the metaverse to the first user;
    further comprising a device control unit configured to control an actuator that is capable of controlling a motion intensity of the first user based on the state information data of the first user;
    further comprising a sensing data analysis unit configured to determine whether the sensing data collected by the sensing data collection unit corresponds to sensing data regarding a speed of the first user, sensing data regarding an action of the first user, or sensing data regarding a biological state of the first user;
    wherein the motion state determination unit, if the sensing data collected by the sensing data collection unit corresponds to the sensing data regarding a speed of the first user, generates movement information data used to be incorporated into a speed and location of the first avatar in the metaverse space as the state information data of the first user;
    wherein the motion state determination unit, if the sensing data collected by the sensing data collection unit corresponds to the sensing data regarding an action of the first user, generates action information data used to be incorporated into an action of the first avatar in the metaverse space as the state information data of the first user;
    wherein the motion state determination unit, if the sensing data collected by the sensing data collection unit corresponds to the sensing data regarding a biological state of the first user, generates biological information data used to adjust a motion intensity of the first avatar by causing the device control unit to control the actuator as the state information data of the first user.

2. The metaverse client terminal of claim 1, wherein the device control unit controls an actuator that is capable of providing sensory effects to the first user in response to a motion of the first avatar in the metaverse space.

3. The metaverse client terminal of claim 2, wherein the state information data of the second user is provided by a mobile metaverse client terminal that collects sensing data regarding the motion of the second user acquired using a gyro sensor or a Global Positioning System (GPS) module.

4. The metaverse client terminal of claim 1, further comprising a device interface unit configured to support data communications between the sensor or actuator and sensing data collection unit and between actuator and device control unit
    wherein the device interface unit receives sensing data regarding the motion of the first user from the sensor or actuator and transfers the sensing data to the sensing data collection unit and
    wherein the device interface unit receives a control signal used to control the operation of the actuator from the device control unit and transfers the control signal to the actuator.

5. A method of providing a metaverse space capable of enabling interaction between users, the method comprising:
    by a metaverse client terminal,
    collecting sensing data regarding a motion of a first user acquired by a sensor;
    determining a motion state of the first user based on the sensing data, and generating state information data of the determined motion state of the first user;
    receiving metaverse information data used to construct a metaverse space and state information data of a second user located in a space different from that of the first user from the metaverse server;
    generating a metaverse space using the received metaverse information data;
    generating a first avatar moving in conjunction with the motion of the first user and a second avatar moving in conjunction with the motion of the second user based on the state information data of the first and second users; and incorporating the first and second avatars into the metaverse space and providing the metaverse to the first user;

wherein collecting the sensing data regarding the motion of the first user includes determining whether the collected sensing data corresponds to sensing data regarding a speed of the first user, sensing data regarding an action of the first user, or sensing data regarding a biological state of the first user;

wherein generating the state information data of the determined motion state of the first user includes, if the collected sensing data corresponds to the sensing data regarding a speed of the first user, generating movement information data used to be incorporated into a speed and location of the first avatar in the metaverse space as the state information data of the first user;

wherein generating the state information data of the determined motion state of the first user includes, if the collected sensing data corresponds to the sensing data regarding an action of the first user, generating action information data used to be incorporated into an action of the first avatar in the metaverse space as the state information data of the first user;

wherein generating the state information data of the determined motion state of the first user includes, if the collected sensing data corresponds to the sensing data regarding a biological state of the first user, generating biological information data used to adjust a motion intensity of the first avatar by causing the device control unit to control the actuator as the state information data of the first user.

6. The method of claim 5, further comprising controlling a second actuator that is capable of providing sensory effects to the first user in response to a motion of the first avatar in the metaverse space.

7. The method of claim 6, wherein the state information data of the second user is provided by a mobile metaverse client terminal that collects sensing data regarding the motion of the second user acquired using a gyro sensor or a GPS module.

8. The method of claim 5, further comprising supporting data communications including receiving sensing data regarding the motion of the user from the sensor or actuator and transferring a control signal to the actuator.

* * * * *